US012612140B2

(12) United States Patent
Chen

(10) Patent No.: US 12,612,140 B2
(45) Date of Patent: Apr. 28, 2026

(54) HEAD-MOUNTED DEVICE AND IMAGING PROJECTION MODULE THEREFOR

(71) Applicant: EOPI CO., LTD, New Taipei City (TW)

(72) Inventor: Hung Ru Chen, Taipei City (TW)

(73) Assignee: EOPI CO., LTD, New Taipei City (TW)

( * ) Notice: Subject to any disclaimer, the term of this patent is extended or adjusted under 35 U.S.C. 154(b) by 0 days.

(21) Appl. No.: 18/911,182

(22) Filed: Oct. 9, 2024

(65) Prior Publication Data

US 2025/0138319 A1 May 1, 2025

Related U.S. Application Data

(60) Provisional application No. 63/543,914, filed on Oct. 12, 2023.

(51) Int. Cl.
| | |
|---|---|
| *G09G 5/00* | (2006.01) |
| *B63C 11/22* | (2006.01) |
| *G02B 27/01* | (2006.01) |
| *B63C 11/18* | (2006.01) |

(52) U.S. Cl.
CPC ...... *B63C 11/2209* (2013.01); *G02B 27/0172* (2013.01); *G02B 27/0176* (2013.01); *B63C 2011/188* (2013.01)

(58) Field of Classification Search
CPC ............ G02B 27/0172; G02B 27/0176; B63C 2011/0188
USPC .......................................................... 345/8
See application file for complete search history.

(56) References Cited

U.S. PATENT DOCUMENTS

| | | | |
|---|---|---|---|
| 10,976,551 B2 | 4/2021 | Cobb | |
| 11,526,013 B2 | 12/2022 | Huang | |
| 2012/0075168 A1* | 3/2012 | Osterhout | G06F 3/017 |
| | | | 345/8 |
| 2017/0123204 A1* | 5/2017 | Sung | G03H 1/2294 |
| 2018/0098056 A1* | 4/2018 | Bohn | G02B 27/017 |
| 2019/0064524 A1* | 2/2019 | Cobb | G02B 1/11 |
| 2023/0273443 A1* | 8/2023 | Heugten | G02B 27/16 |
| | | | 345/8 |
| 2023/0341686 A1* | 10/2023 | Koch | G02B 27/283 |
| 2024/0345397 A1 | 10/2024 | Wu et al. | |

FOREIGN PATENT DOCUMENTS

WO        2016135727 A1    9/2016

* cited by examiner

*Primary Examiner* — Jonathan M Blancha

(57) ABSTRACT

A head-mounted device includes goggles and an image projection module. The image projection module includes a housing fixed on the goggles, an optical element, a projector fixed on the housing and a reflective element disposed within the housing. The housing defines a channel and first and second channel openings. The projector is configured to project an image light beam toward the optical element located in the channel through first and second optical surfaces of the optical element sequentially. The reflective element is configured to receive the image light beam and reflect the received image light beam to generate a reflected light beam directed to the second optical surface. The optical element is configured to refract the reflected light beam toward a lens of the goggles to generate a refracted light beam leaving the channel from the first channel opening and passing through the lens for forming an image.

18 Claims, 13 Drawing Sheets

HEAD-MOUNTED DEVICE AND IMAGING PROJECTION MODULE THEREFOR

CROSS-REFERENCE TO RELATED APPLICATION(S)

This application claims the benefit of and priority to the U.S. Provisional Patent Application No. 63/543,914, filed on Oct. 12, 2023, the disclosure of which is incorporated herein by reference in the entirety.

FIELD

The present disclosure relates to a head-mounted device, and in particular, to a head-mounted device having an imaging projection module.

BACKGROUND

The rapid development of technology in recent years has had a profound impact on the way many industries operate. Especially in high-risk environments such as diving, fire-fighting and military activities, the demand for real-time information becomes increasingly urgent. Traditional operating modes often rely on radios or other external devices to obtain information. These modes not only affect work efficiency but may also increase the risk of injury in an emergency. Therefore, it is necessary to provide a head-mounted device that can provide real-time information to improve the safety of users when the users perform tasks in these high-risk environments.

SUMMARY

The present disclosure provides a head-mounted device, which includes goggles and an image projection module. The goggle have a frame and a lens. The frame defines an opening, and the lens is mounted on the opening. The image projection module includes a housing, an optical element, a projector and a reflective element. The housing is fixed on the frame and defines a channel, a first channel opening and a second channel opening, wherein the channel is between the first channel opening and the second channel opening. The first channel opening is adjacent to the opening. The optical element is located in the channel and has a first optical surface and a second optical surface. The projector is fixed on the housing and configured to project an image light beam toward the optical element, such that the image light beam passes through the first optical surface and the second optical surface sequentially. The reflective element is disposed within the housing and configured to receive the image light beam passing through the first optical surface and the second optical surface and reflect the received image light beam to generate a reflected light beam directed to the second optical surface. The optical element is configured to refract the reflected light beam toward the lens to generate a refracted light beam, such that the refracted light beam leaves the channel from the first channel opening and passes through the lens for forming an image.

In an embodiment of the present disclosure, the housing has a top wall, a bottom wall, a first side wall and a second side wall, and the top wall, the bottom wall, the first side wall and the second side wall are connected to each other to define the channel, the first channel opening and the second channel opening. The projector is fixed on the top wall, the reflective element is disposed on the bottom wall, and the channel is located between the projector and the reflective element.

In an embodiment of the present disclosure, the housing further has a first extension wall connected between the bottom wall, the first side wall and the second side wall. The first extension wall, the bottom wall, the first side wall and the second side wall define a first containing space, and the reflective element is located in the first containing space.

In an embodiment of the present disclosure, the optical element is a flat-plate beam splitter and has at least one side fixed on the first extension wall.

In an embodiment of the present disclosure, an angle is formed between the first optical surface and the second channel opening, and the angle is between 10 degrees and 85 degrees.

In an embodiment of the present disclosure, the reflective element has a reflective curved surface configured to receive the image light beam passing through the first optical surface and the second optical surface and reflect the received image light beam to generate the reflected light beam directed to the second optical surface.

In an embodiment of the present disclosure, the housing further has a second extension wall connected between the top wall, the first side wall and the second side wall. The second extension wall, the top wall, the first side wall and the second side wall define a second containing space, and at least one portion of the projector is located in the second containing space. The second channel opening is defined between the first extension wall and the second extension wall.

In an embodiment of the present disclosure, the image projection module further includes at least one connection element disposed on at least one of the top wall, the bottom wall, the first side wall and the second side wall and configured to connect to the frame to fix the housing on the goggles.

In an embodiment of the present disclosure, the head-mounted device further includes a processor electrically connected to the projector and configured to generate information. The projector generates the image light beam according to the information, such that the information is presented in the image.

In an embodiment of the present disclosure, the head-mounted device further includes a sensor electrically connected to the processor and configured to sense physical quantity of an external environment and transmit the physical quantity to the processor. The processor is further configured to generate the information according to the physical quantity.

In one embodiment of the present disclosure, the head-mounted device further includes a camera module electrically connected to the processor and configured to capture an image and transmit the image to the processor. The processor is further configured to generate the information according to the image.

In an embodiment of the present disclosure, the head-mounted device further includes a communication module electrically connected to the processor and configured to receive a wireless signal, convert the wireless signal to an electronic signal and transmit the electronic signal to the processor. The processor is further configured to generate the information according to the electronic signal.

The present disclosure also provides an image projection module mounted on a head-mounted device. The head-mounted device has goggles. The image projection module includes a housing, at least one connecting element, an optical element, a projector and a reflective element. The housing has a top wall, a bottom wall, a first side wall and a second side wall, and the top wall, the bottom wall, the first side wall and the second side wall are connected to each other to define a channel, a first channel opening and a second channel opening. The channel is between the first channel opening and the second channel opening, and the first channel opening is adjacent to the opening. The at least one connection element is disposed on at least one of the top wall, the bottom wall, the first side wall and the second side wall and configured to connect a frame of the goggles to fix the housing on the goggles. The optical element is located in the channel and has a first optical surface and a second optical surface. The projector is fixed on the housing and configured to project an image light beam toward the optical element, such that the image light beam passes through the first optical surface and the second optical surface sequentially. The reflective element is disposed within the housing and configured to receive the image light beam passing through the first optical surface and the second optical surface and reflect the received image light beam to generate a reflected light beam directed to the second optical surface. The optical element is configured to refract the reflected light beam toward the lens to generate a refracted light beam, such that the refracted light beam leaves the channel from the first channel opening and passes through the lens for forming an image.

In an embodiment of the present disclosure, the projector is fixed on the top wall, the reflective element is disposed on the bottom wall, and the channel is located between the projector and the reflective element.

In an embodiment of the present disclosure, the housing further has a first extension wall and a second extension wall. The first extension wall is connected between the bottom wall, the first side wall and the second side wall. The second extension wall is connected between the top wall, the first side wall and the second side wall. The second channel opening is defined between the first extension wall and the second extension wall. The first extension wall, the bottom wall, the first side wall and the second side wall define a first containing space, and the reflective element is located in the first containing space. The second extension wall, the top wall, the first side wall and the second side wall define a second containing space, and at least one portion of the projector is located in the second containing space. The optical element is a flat-plate beam splitter and has at least one side fixed on the first extension wall. An angle is formed between the first optical surface and the second channel opening, and the angle is within a range between 10 degrees and 85 degrees.

In an embodiment of the present disclosure, the reflective element has a reflective curved surface configured to receive the image light beam passing through the first optical surface and the second optical surface and reflect the received image light beam to generate the reflected light beam directed to the second optical surface.

In an embodiment of the present disclosure, the image projection module further includes a processor electrically connected to the projector and configured to generate information. The projector generates the image light beam according to the information, such that the information is presented in the image.

In an embodiment of the present disclosure, the image projection module further includes a sensor electrically connected to the processor and configured to sense physical quantity of an external environment and transmit the physical quantity to the processor. The processor is further configured to generate the information according to the physical quantity.

In one embodiment of the present disclosure, the image projection module further includes a camera module electrically connected to the processor and configured to capture an image and transmit the image to the processor. The processor is further configured to generate the information according to the image.

In an embodiment of the present disclosure, the image projection module further includes a communication module electrically connected to the processor and configured to receive a wireless signal, convert the wireless signal to an electronic signal and transmit the electronic signal to the processor. The processor is further configured to generate the information according to the electronic signal.

DETAILED DESCRIPTION

In the present disclosure, "a", "an" and "the" may refer to a singular form or a plural form, unless an article is specifically restricted to be a singular form in the context.

In addition, as used herein, the terms "comprise/comprising", "include/including", "have/having" and the like are open-ended terms that imply the inclusion of the disclosed features, elements and/or components, but do not preclude the presence or addition of one or more other features, elements, components, and/or groups thereof.

Furthermore, the ordinal terms (such as "first", "second", "third" and the like) used in the present disclosure and claims are used to modify an element itself and do not imply any priority or any order of one element over another element, or do not imply a chronological order of steps of a method performed, but are used only as symbols to distinguish a claimed element having a particular name from another element having the same name.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1A:
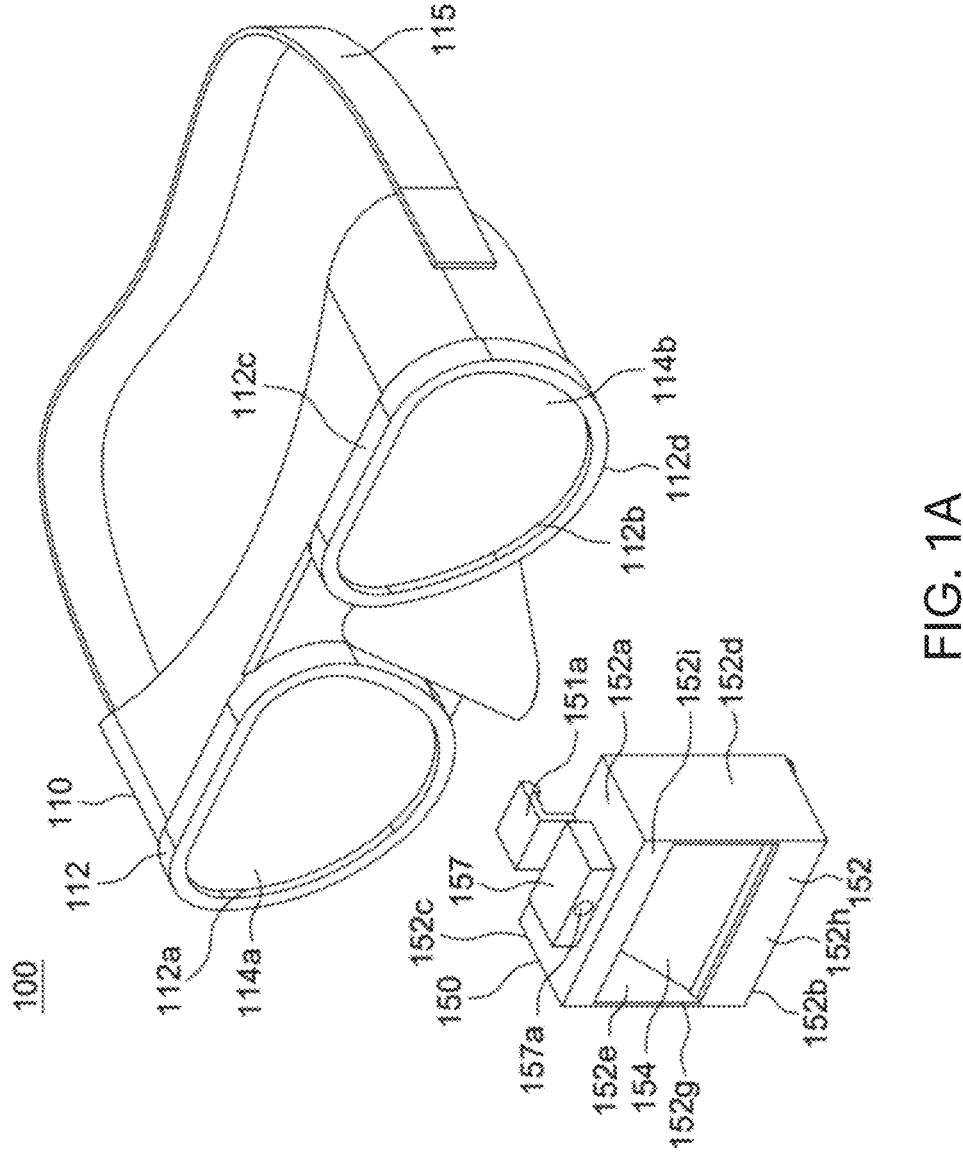
FIG. 1A is an exploded view of a head-mounted device according to an embodiment of the present disclosure.
Figure 1B:
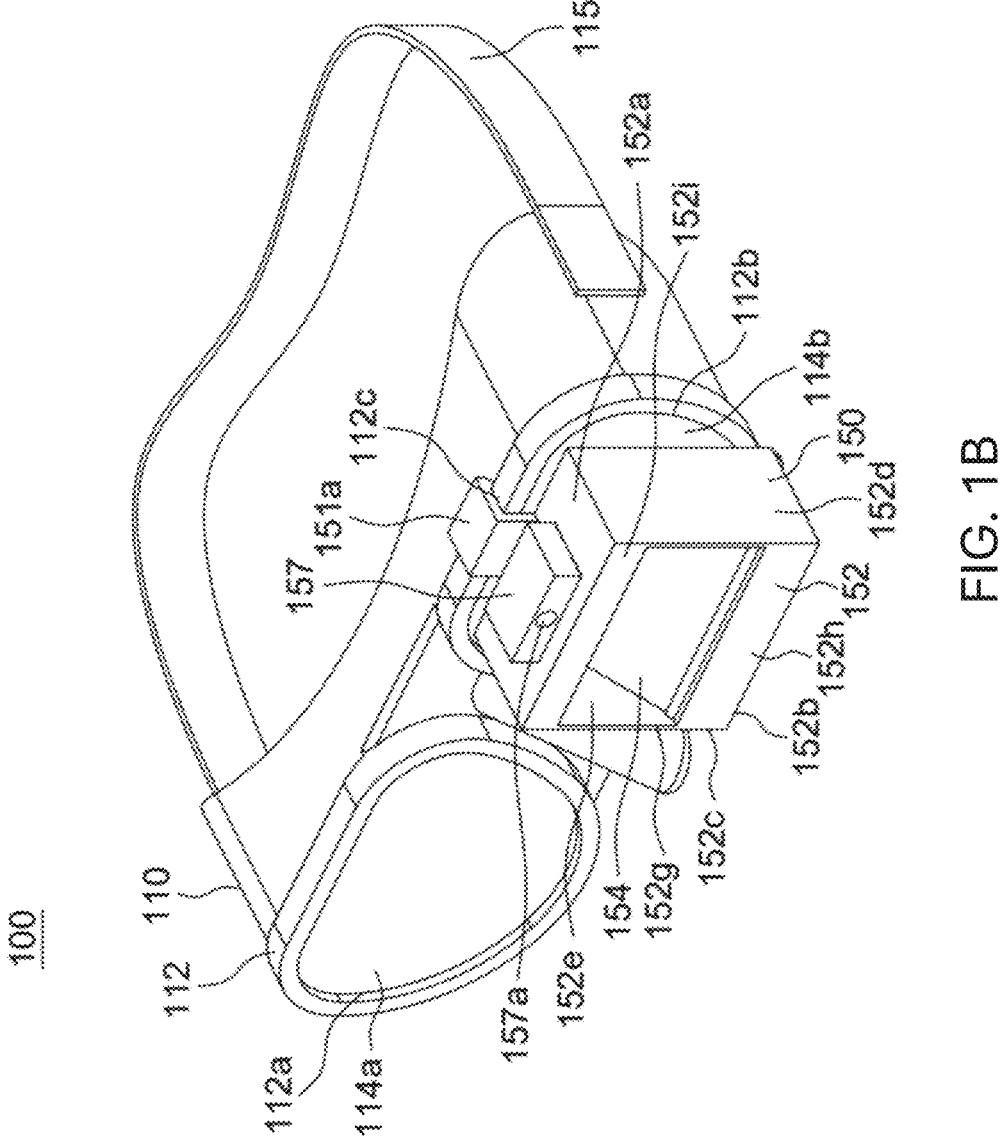
FIG. 1B is an assembly diagram of a head-mounted device according to an embodiment of the present disclosure.
Figure 1C:
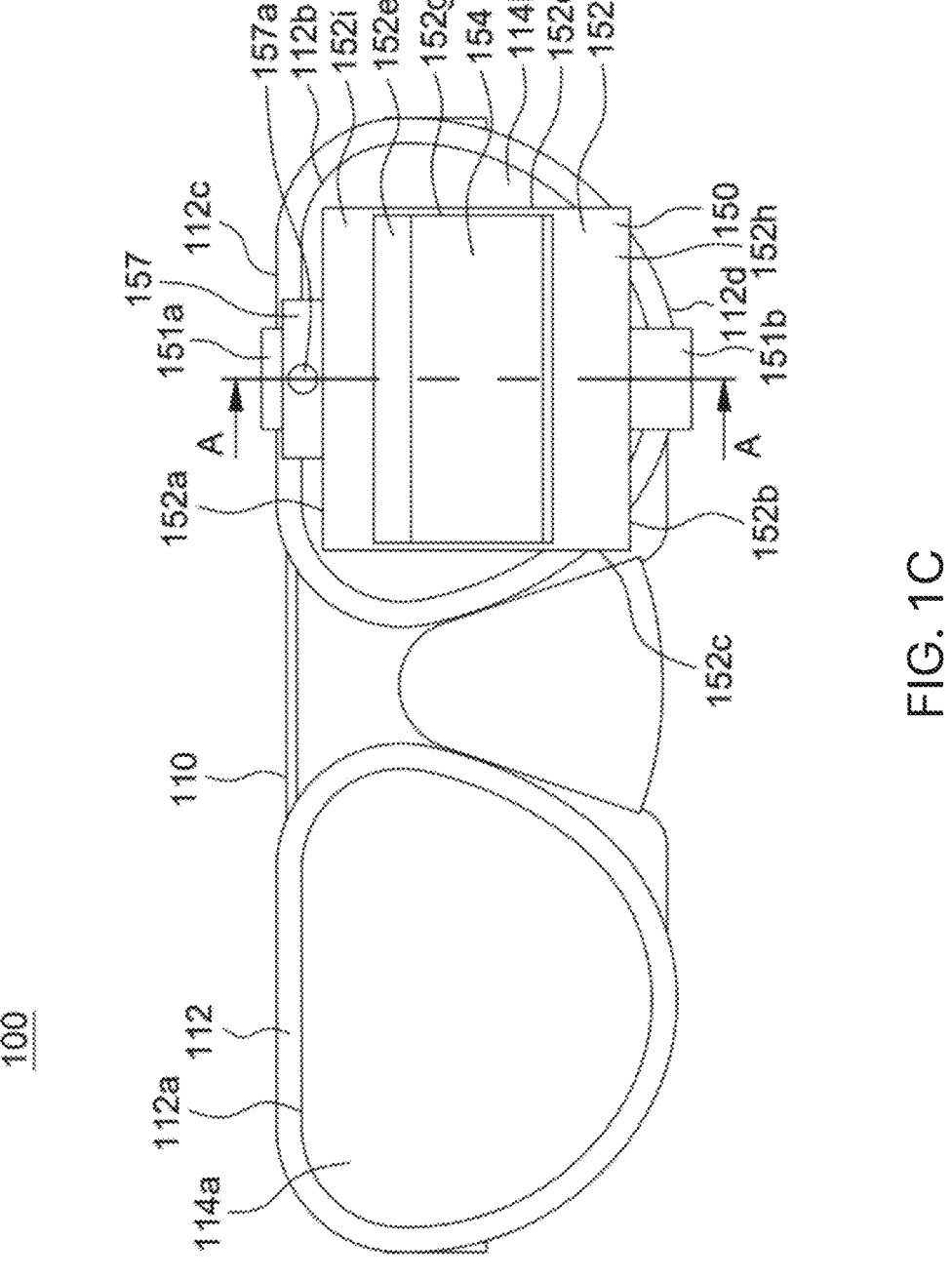
FIG. 1C is a front plan view of the head-mounted device of FIG. 1B.
Figure 1D:
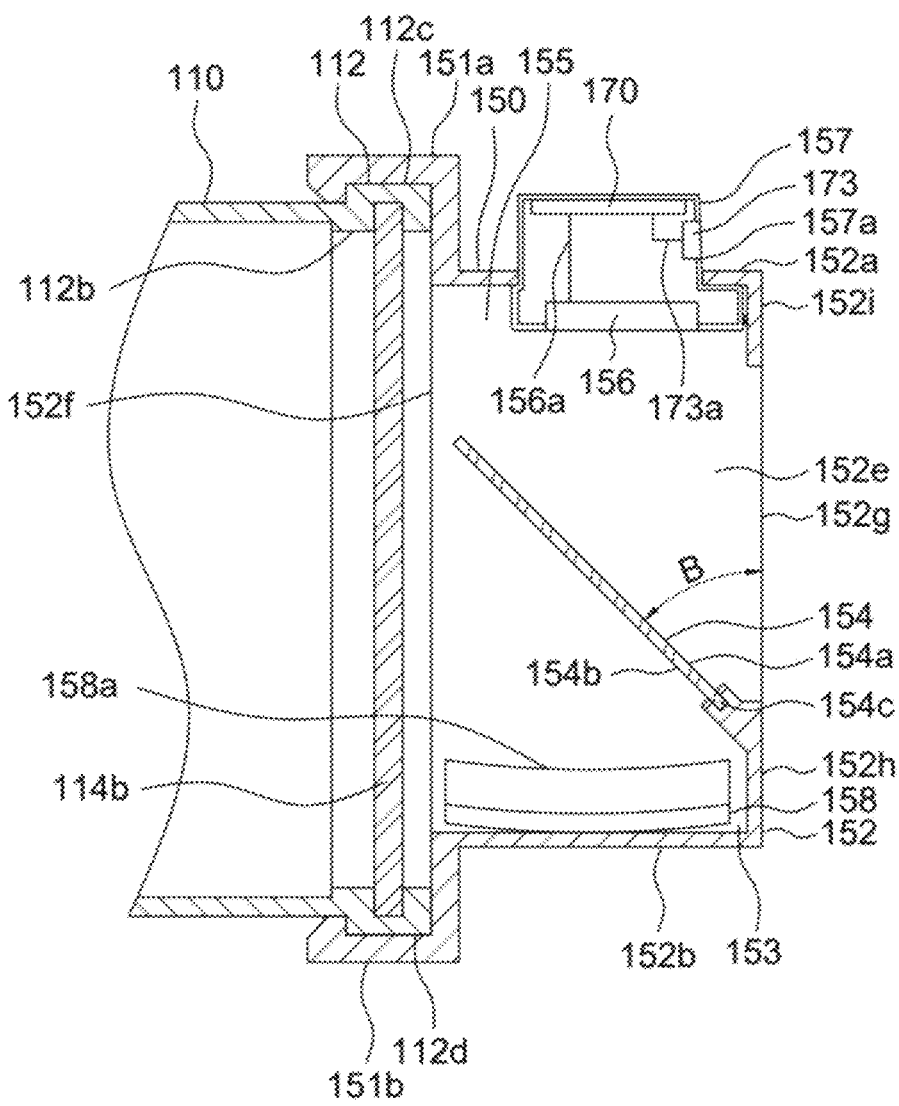
FIG. 1D is a cross-sectional view along a line A-A in FIG. 1B.

FIG. 1A and FIG. 1B are respectively an exploded view and an assembly view of a head-mounted device 100 according to an embodiment of the present disclosure. FIGS. 1C and 1D are respectively a front plan view and a cross-sectional view along a line A-A of the head-mounted device 100 of FIG. 1B. Referring to FIG. 1A to FIG. 1D, the head-mounted device 100 includes goggles 110 and an image projection module 150. The goggles 110 have a frame 112, a first lens 114a, a second lens 114b and a wearing portion 115. The frame 112 defines a first opening 112a and a second opening 112b. The first lens 114a and the second lens 114b are respectively mounted on the first opening 112a and the second opening 112b. The wearing portion 115 is configured to be put on a user's head to fix the goggles 110 on the user's head. In the present embodiment, the goggles 110 are shown by a schematic diagram. They may be goggles of a diver mask, goggles of a fire mask, goggles of a military gas mask, or goggles of another mask for various purposes, however, the present disclosure is not limited thereto.

In this embodiment, the image projection module 150 includes a housing 152, a first connection element 151a and a second connection element 151b. The first connection element 151a and the second connection element 151b are disposed on the housing 152 and are configured to connect the frame 112 to fix the housing 152 on the goggles 110. In this embodiment, the first connection element 151a and the second connection element 151b are provided with hook structures and configured to be connected to an upper edge 112c and a lower edge 112d of the frame 112 in an engaging manner respectively. In other embodiments, the first connection element 151a and the second connection element 151b are not limited to the hook structures, and they may be provided with other connection structures, such as screw or bolt structures, and match screw holes on the frame 112 to fix the housing 152 110 on the goggles. In addition, in the present embodiment, the frame 112 in FIG. 1A is shown by a schematic diagram. Thus, the shape of the frame 112 can be various according to the application on different masks (such as diver masks, fire masks, military gas masks, etc.) without limitation to the frame 112 shown in FIG. 1A.

The housing 152 has a top wall 152a, a bottom wall 152b, a first side wall 152c and a second side wall 152d, and the top wall 152a, the bottom wall 152b, the first side wall 152c and the second side wall 152d are connected to each other to define a channel 152e, a first channel opening 152f and a second channel opening 152g. The channel 152e is between the first channel opening 152f and the second channel opening 152g, and the first channel opening 152f is adjacent to the second opening 112b of the frame 112. The housing 152 further has a first extension wall 152h and a second extension wall 152i. The first extension wall 152h is connected between the bottom wall 152b, the first side wall 152c and the second side wall 152d. The first extension wall 152h, the bottom wall 152b, the first side wall 152c and the second side wall 152d define a first containing space 153. The second extension wall 152i is connected between the top wall 152a, the first side wall 152c and the second side wall 152d. The second extension wall 152i, the top wall 152a, the first side wall 152c and the second side wall 152d define a second containing space 155. The second passage opening 152g is defined between the first extension wall 152h and the second extension wall 152i.

In the present embodiment, the first connection element 151a and the second connection element 151b are disposed on the top wall 152a and the bottom wall 152b respectively, however, the present disclosure is not limited thereto. In other alternative embodiments, the first connection element 151a and the second connection element 151b can be disposed on the first side wall 152c and the second side wall 152d respectively. In an alternative embodiment, only one of the first connection element 151a and the second connection element 151b is used and disposed on one of the top wall 152a, the bottom wall 152b, the first side wall 152c and the second side wall 152d for achieving the purpose of fixing the housing 152 on the goggles 110.

In the present embodiment, the image projection module 150 further includes an optical element 154, a projector 156 and a reflective element 158. The optical element 154 is located on the channel 152e and has a first optical surface 154a and a second optical surface 154b. The projector 156 is fixed on the housing 152, and at least one portion of the projector 156 is located in the second containing space 155. In the present embodiment, the projector 156 is disposed in a case 157, and the case 157 is fixed on the top wall 152a of the housing 152, such that the projector 156 can be fixed on the top wall 152a of the housing 152. In another embodiment, the case 157 can be integrally formed on the housing 152. In addition, the reflective element 158 is disposed on the bottom wall 152b of the housing 152 and located in the first containing space 155. The channel 152e is further located between projector 156 and reflective element 158.

In the present embodiment, the optical element 154 is a flat-plate beam splitter and has at least one side 154c fixed on the first extension wall 152h. In addition, an angle B is formed between the first optical surface 154a and the second channel opening 152g, and the angle B can be within a range between 10 degrees and 85 degrees according to the different optical characteristics of the optical element 154.

Figure 1E:
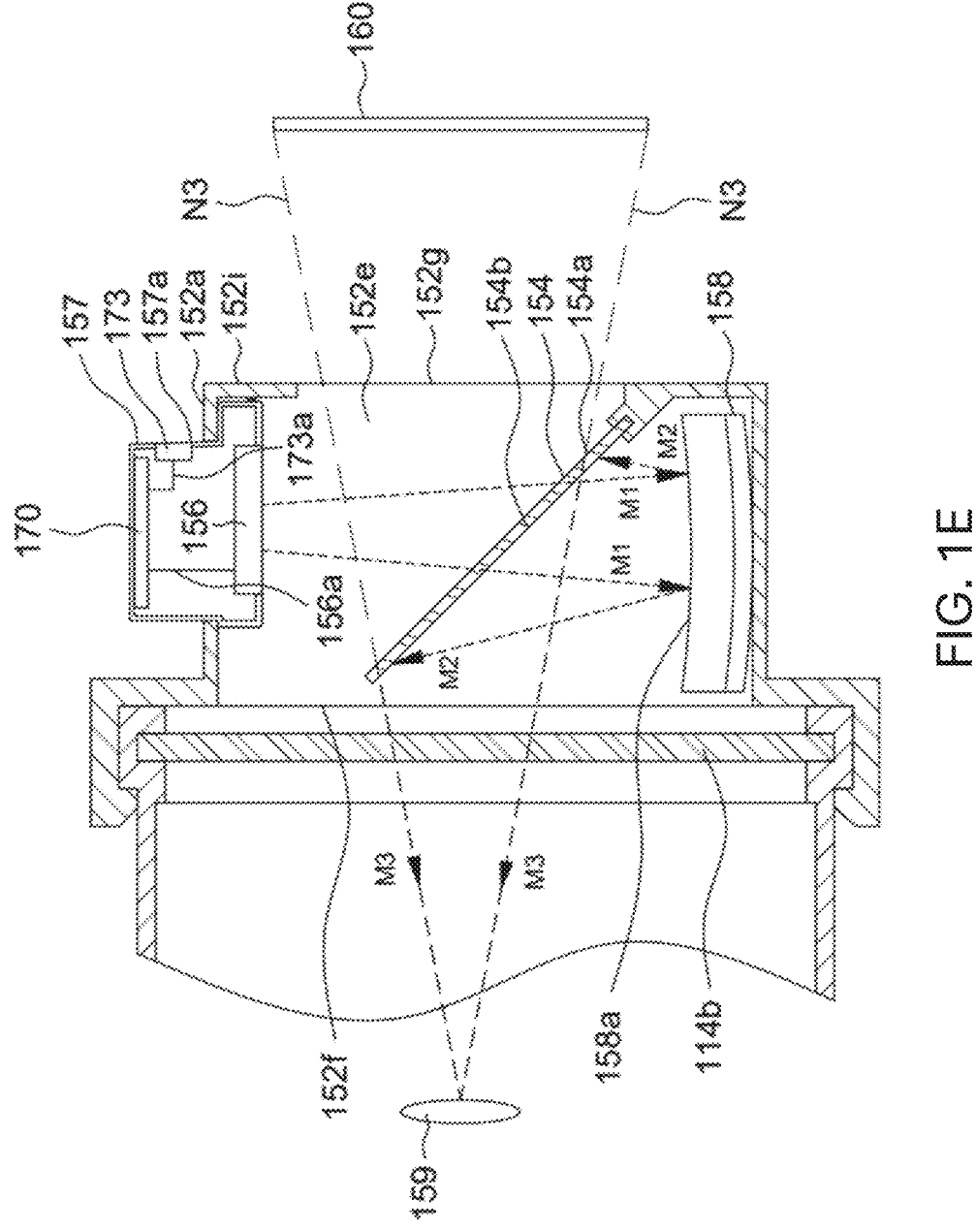
FIG. 1E is a cross-sectional view along a line A-A in FIG. 1B to illustrate an image imaging principle of the head-mounted device according to an embodiment of the present disclosure.
Figure 2:
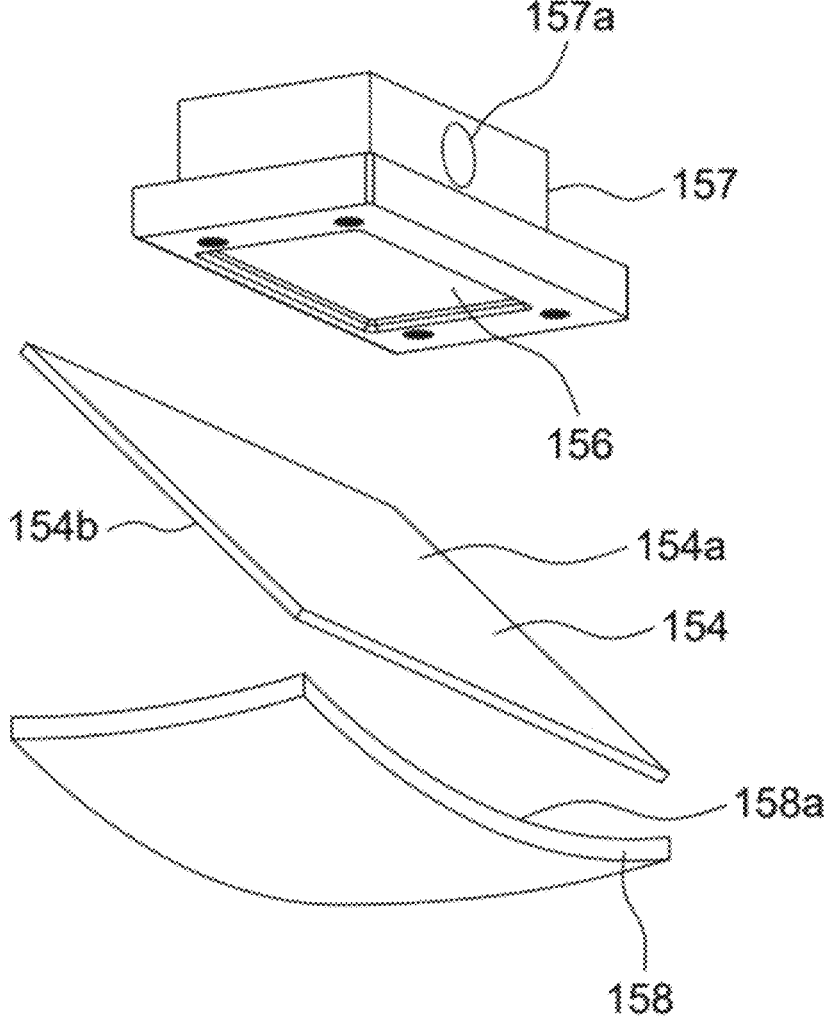
FIG. 2 is a three-dimensional schematic view of the image projection module in FIG. 1A to FIG. 1E when a housing is removed.

FIG. 1E is a cross-sectional view along a line A-A in FIG. 1B to illustrate an image imaging principle of the head-mounted device 100 according to an embodiment of the present disclosure. FIG. 1E is substantially the same as FIG. 1D, and the only difference therebetween is that FIG. 1E marks traveling paths of image light rays projected by the projector 156 to form an image 160. FIG. 2 is a three-dimensional schematic view of the image projection module in FIG. 1A to FIG. 1E when a housing is removed. Referring to FIG. 1E and FIG. 2, the projector 156 is configured to project an image light beam, which includes multiple image light rays M1, toward the optical element 154, such that the image light beam passes through the first optical surface 154a and the second optical surface 154b sequentially. The reflective element 158 has a reflective curved surface 158a, which is configured to receive the image light beam passing through the first optical surface 154a and the second optical surface 154*b* and reflect the received image light beam to generate a reflected light beam, which includes multiple reflected light rays M2, directed to the second optical surface 154*b*. The optical element 154 is configured to refract the reflected light beam toward the second lens 114*b* to generate a refracted light beam including multiple refracted light rays M3, such that the refracted light beam leaves the channel 152*e* from the first channel opening 152*f* and then enters a user's eye 159 through the second mirror 114*b* to form an image 160. In the present embodiment, the image 160 seen by the user is a virtual image, and the virtual image is imaged on an area which extends outside the second channel opening 152*g* along the an opposite direction of the multiple refracted light rays M3, as shown in FIG. 1E. Specifically, when the multiple refracted light rays M3 enter the eye 159, the user sees the image 160 formed by the multiple refracted light rays M3, and the image 160 seen by the user looks like it is imaged outside the second channel opening 152*g*.

Figure 3:
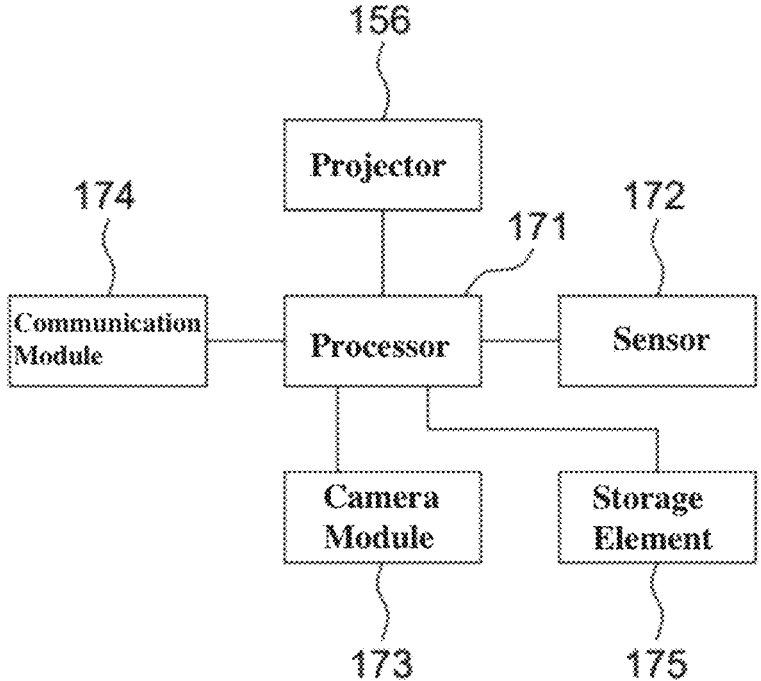
FIG. 3 is a block diagram of a circuit system of a head-mounted device according to an embodiment of the present disclosure.

FIG. 3 is a block diagram of a circuit system of a head-mounted device according to an embodiment of the present disclosure. Please refer to FIG. 1D, FIG. 1E and FIG. 3. The head-mounted device 100 further includes a circuit substrate 170, a processor 171, a sensor 172, a camera module 173, a communication module 174 and a storage element 175. In the present embodiment, the circuit substrate 170 is disposed in the case 157, and the processor 171 and the storage element 175 are disposed on the circuit substrate 170. The processor 171 is electrically connected to the projector 156, the sensor 172, the camera module 173, the communication module 174 and the storage component 175 and configured to generate information. The processor 171 may be a central processing unit, a microprocessor, an application specific integrated circuits (ASIC), another processor capable of executing programs, or a various combination thereof, and is not limited to a single processor 171. The storage element 175 may be a random access memory (Random Access Memory, RAM), a read-only memory (ROM), a flash memory, another similar device or a combination of these devices. The projector 156 can be electrically connected to the processor 171 provided on the circuit substrate 170 through a first connection line 156*a* and generate an image light beam including multiple image light rays M1 according to the information generated by the processor 171, such that the information is shown in the image 160.

In the present embodiment, the optical element 154 is a transparent optical element. Thus, when seeing the image 160, the user can also see a real object on the second channel opening 152 through a light path passing the second lens 114*b*, the optical element 154 and the second channel opening 152*g*.

In the present embodiment, the sensor 172 is configured to sense physical quantity of an external environment and transmit the physical quantity to the processor 171. The processor 171 is further configured to generate the information according to the physical quantity. In an embodiment, the head-mounted device 100 can be used in a diver mask, and the sensor 172 can be a temperature sensor, an air pressure sensor and/or a depth sensor, however, it is not limited thereto. In addition, the sensor 172 can be disposed on an opening 157*a* of the case 157 to sense physical quantity of the external environment.

Figure 4:
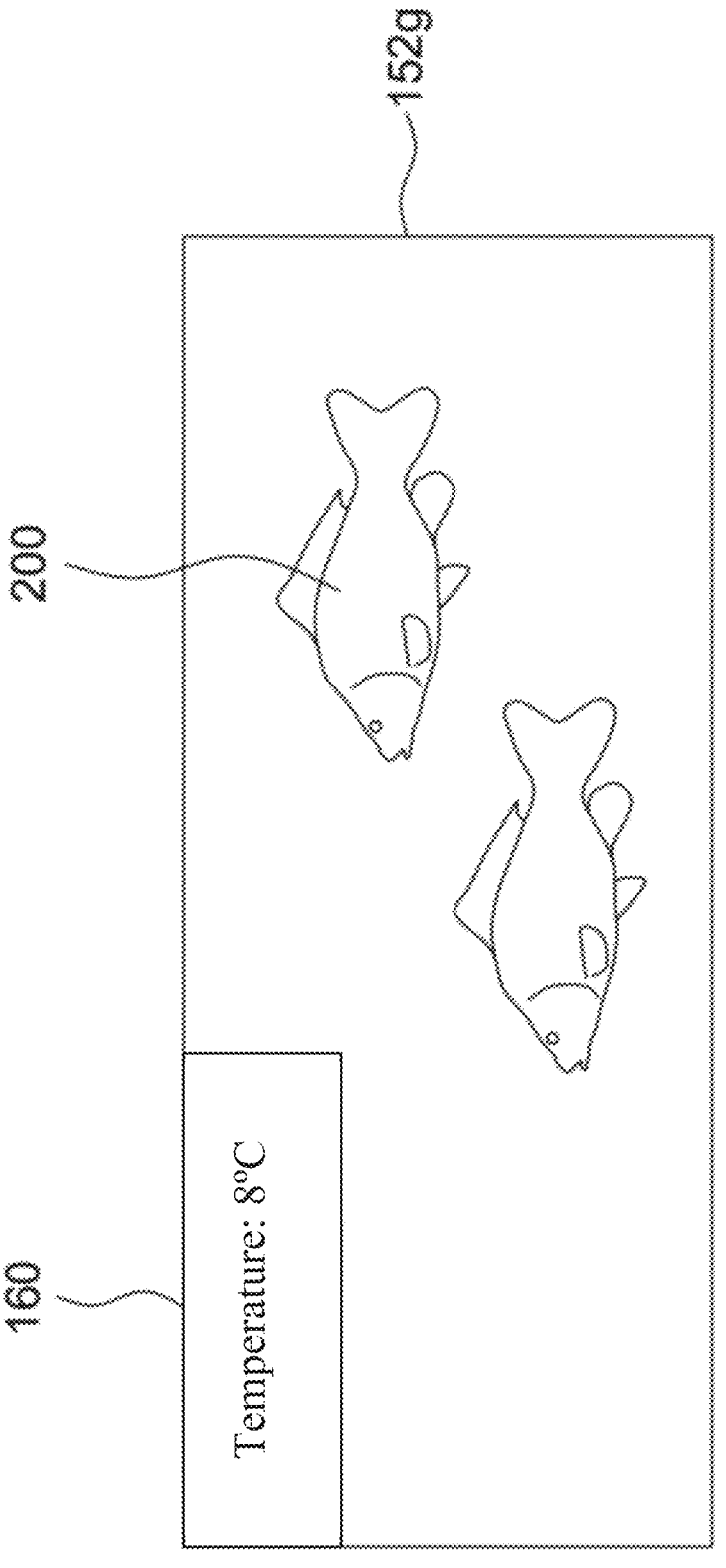
FIG. 4 is a first image imaging example when a head-mounted device is used in a diver mask according to an embodiment of the present disclosure.

In a first imaging example, when the sensor 172 is a temperature sensor, the sensed physical quantity is a temperature. After the sensor 172 senses the temperature of the water (for example, 8 degrees Celsius), the sensor 172 generates a corresponding temperature value according to the sensed temperature and transmits the temperature value to the processor 171. Then, the processor 171 generates temperature information (for example, Temperature: 8° C.) according to the temperature value received from the sensor 172, and the projector 156 generates an image light beam according to the temperature information, such that the temperature information (for example, Temperature: 8° C.) is shown in the image 160, as shown in FIG. 4. In the present embodiment of FIG. 4, the user wearing the head-mounted device 100 of the disclosed embodiment can also view the image 160 showing "Temperature: 8° C." and simultaneously see a real object (for example: a fish 200 swimming in the water) outside the second channel opening 152 through a light path passing the second lens 114*b*, the optical element 154 and the second channel opening 152*g*.

Figure 5:
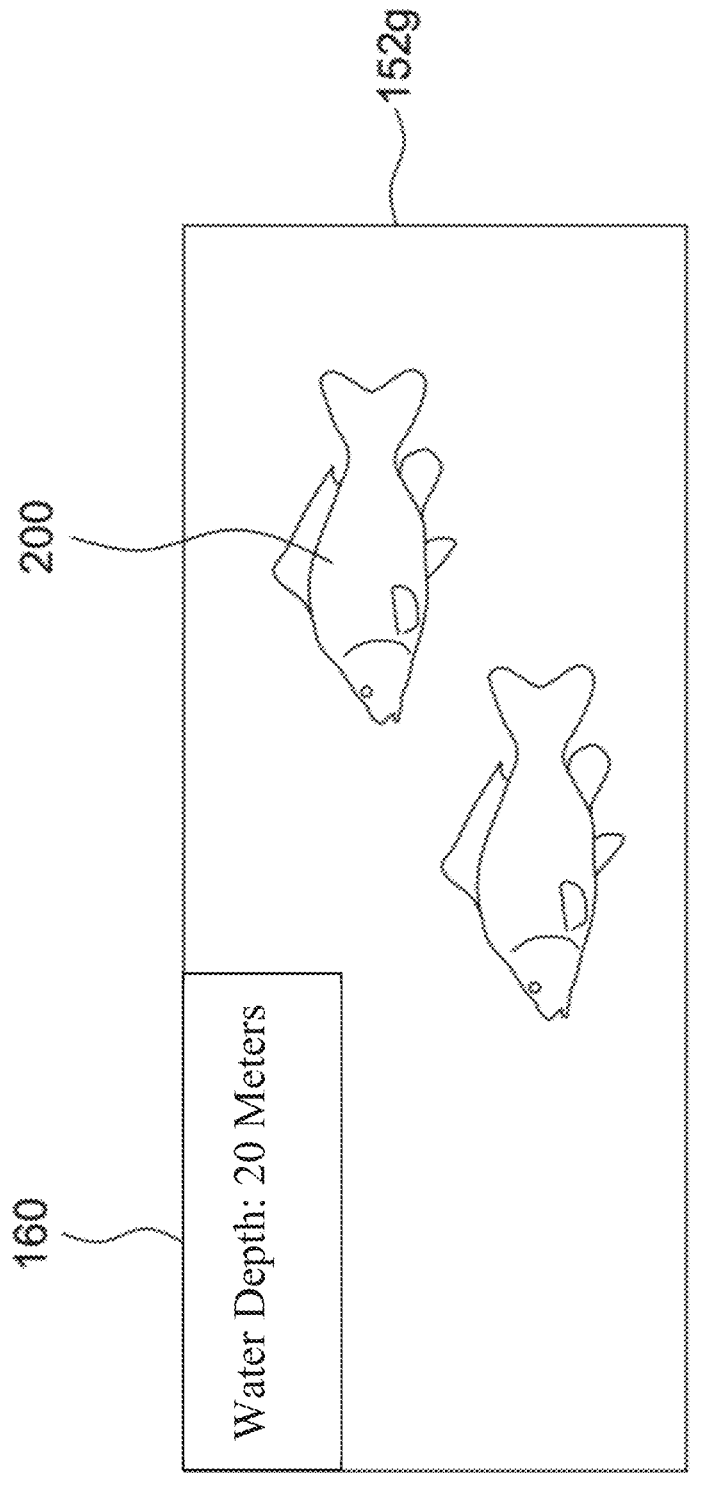
FIG. 5 is a second image imaging example when a head-mounted device is used in a diver mask according to an embodiment of the present disclosure.

In a second imaging example, when the sensor 172 is a depth sensor, the sensed physical quantity is a water depth. After the sensor 172 senses the water depth (for example, 20 meters below the water level), the sensor 172 generates a corresponding water depth value according to the sensed water depth and transmits the water depth value to the processor 171. Then, the processor 171 generates water depth information (for example, Water Depth: 20 Meters) according to the water depth value received from the sensor 172, and the projector 156 generates an image light beam according to the water depth information, such that the water depth information (for example, Water Depth: 20 Meters) is shown in the image 160, as shown in FIG. 5.

Figure 6:
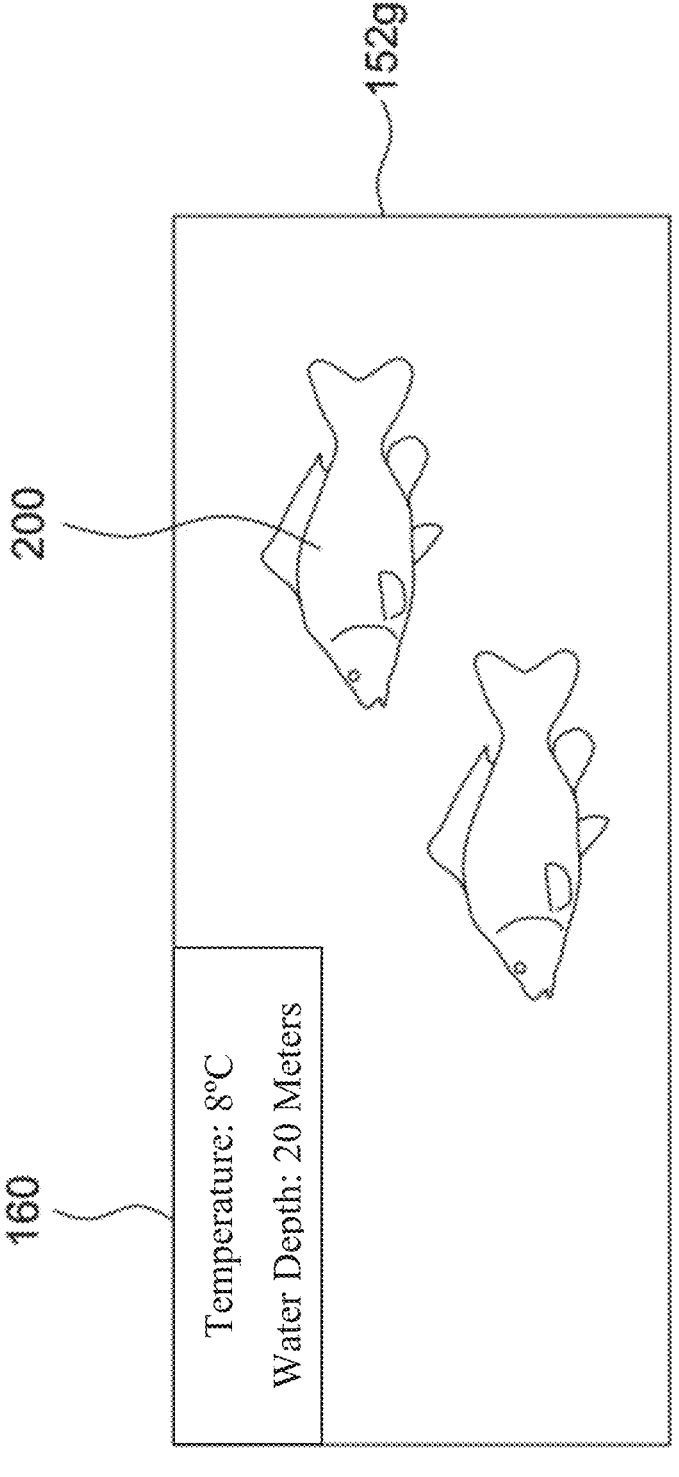
FIG. 6 is a third image imaging example when a head-mounted device is used in a diver mask according to an embodiment of the present disclosure.

In a third imaging example, the head-mounted device 100 may include at least two sensors 172. For example, the head-mounted device 100 includes two sensors 172, which are a temperature sensor and a depth sensor. The processor 171 generates temperature information (for example, Temperature: 8° C.) and water depth information (for example, Water Depth: 20 Meters) according to the temperature value and the water depth value received from the two sensors 172, and the projector 156 generates an image light beam according to the temperature information and the water depth information, such that the temperature information (for example, Temperature: 8° C.) and the water depth information (for example, Water Depth: 20 Meters) are simultaneously shown in the image 160, as shown in FIG. 6.

In the present embodiment, the lens of the camera module 173 can be disposed on an opening 157*a* of the case 157 and electrically connected to the processor 171 provided on the circuit substrate 170 through a second connection line 173*a*. The camera module 173 is configured to capture an environment image and transmit the image to the processor 171. The processor 171 is further configured to generate the information according to the environment image.

Figure 7:
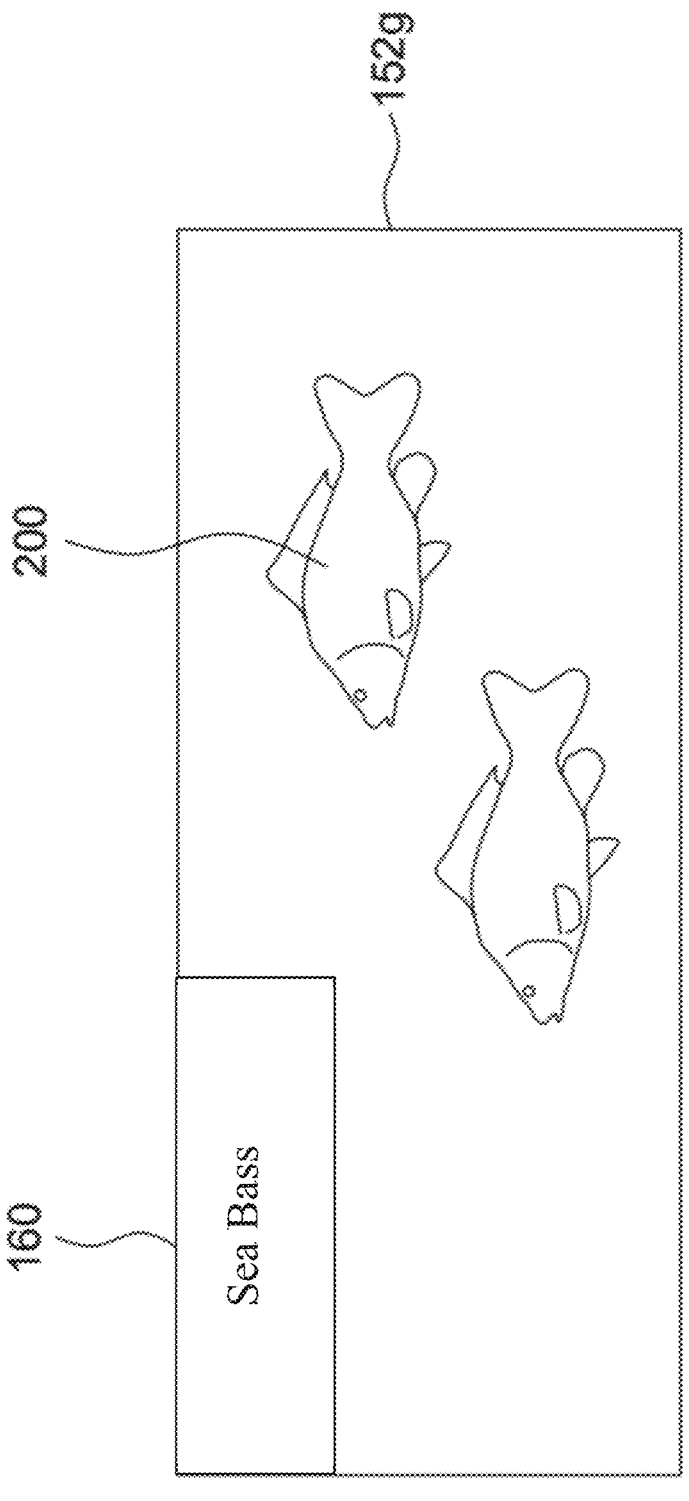
FIG. 7 is a fourth image imaging example when a head-mounted device is used in a diver mask according to an embodiment of the present disclosure.

In a fourth imaging example, after the camera module 173 captures an environment image, the camera module 173 transmits the environment image to the processor 171. Then, the processor 171 analyzes objects in the environmental image to generate an analysis result and generates object-related information (for example, Sea Bass) according to the analysis result, and the projector 156 generates an image light beam according to the object-related information, such that the object-related information (for example, Sea Bass) is shown in the image 160, as shown in FIG. 7. In this imaging example, the storage device 175 is configured to store an artificial intelligence (AI) model, and the processor 171 analyzes the objects in the environmental image using the AI model to generate an analysis result and generates the object-related information (for example, Sea Bass) according to the analysis result.

In a fifth imaging example, the sensor 172 is a depth sensor, and the processor 171 generates water depth information (for example, Water Depth: 20 Meters) according to a water depth value received from the sensor 172 and generates object-related information (for example, Sea Bass) according to an environmental image captured by the camera module 173. Then, the projector 156 generates an image light beam according to the water depth information (for example, Water Depth: 20 Meters) and the object-related information (for example, Sea Bass) generated by the processor 171, such that the water depth information (for example, Water Depth: 20 Meters) and the object-related information (for example, Sea Bass) is shown in the image 160, as shown in FIG. 8.

In the present embodiment, the communication module 174 is configured to receive a wireless signal, convert the wireless signal to an electronic signal and transmit the electronic signal to the processor 171. The processor 171 is further configured to generate the information according to the electronic signal. The communication module 174 may be a chip or circuit using a wireless LAN (WLAN) technology or mobile communication technology. The wireless LAN is, for example, Wi-Fi. The mobile communication technology is, for example, a global system for mobile communications (GSM), third-generation (3G) mobile communication technology, fourth-generation (4G) mobile communication technology, fifth-generation (5G) mobile communication technology, etc.

Figure 9:
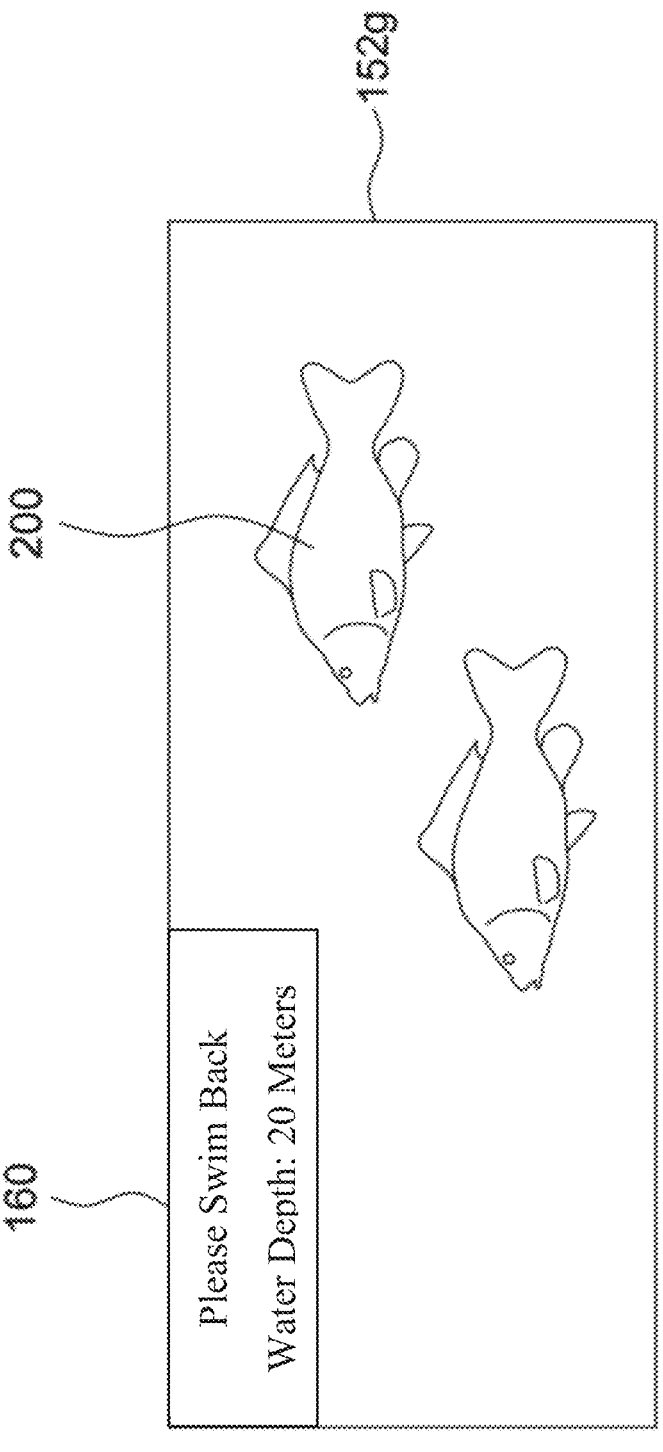
FIG. 9 is a sixth image imaging example when a head-mounted device is used in a diver mask according to an embodiment of the present disclosure.

In a sixth imaging example, the sensor 172 is a depth sensor, and a wireless signal received by the communication module 174 is a wireless signal carrying a message. The communication module 174 converts the wireless signal carrying the message to an electronic signal and transmits the electronic signal to the processor 171. The processor 171 generates message information (for example, Please Swim Back) according to the electronic signal and further generates water depth information (for example, Water Depth: 20 Meters) according to a water depth value received from the sensor 172. Then, the projector 156 generates an image light beam according to the message information (for example, Please Swim Back) and the water depth information (for example, Water Depth: 20 Meters) generated by the processor 171, such that the message information (for example, Please Swim Back) and the water depth information (for example, Water Depth: 20 Meters) are shown in the image 160, as shown in FIG. 9.

Figure 8:
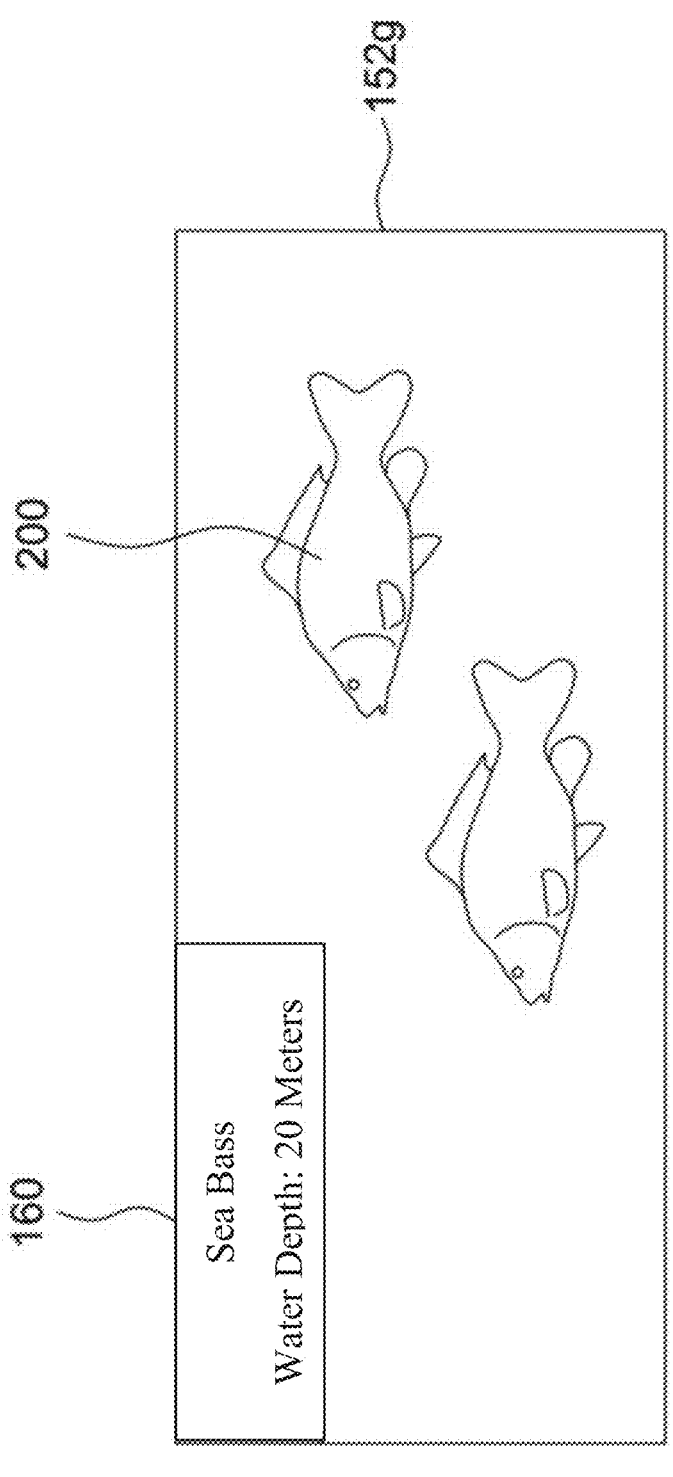
FIG. 8 is a fifth image imaging example when a head-mounted device is used in a diver mask according to an embodiment of the present disclosure.

In the above imaging example, the processor 171 can record and store the generated information, for example "Temperature: 8° C." and "Water Depth: 20 Meters" shown in FIG. 6, "Sea Bass" and "Water Depth: 20 Meters" shown in FIG. 8 in the storage element 175.

In the present embodiment, the circuit substrate 170, the processor 171, the sensor 172, the camera module 173, the communication module 174 and the storage element 175 are all disposed in the case 157, however, the present disclosure is not limited thereto. In other embodiments, at least one of the circuit substrate 170, the processor 171, the sensor 172, the camera module 173, the communication module 174 and the storage element 175 may be disposed in another case outside the case 157. In addition, when the head-mounted device 100 is applied to a diver mask, the case 157 must have a waterproof structure to prevent electronic components in the case 157 from being damaged by contacting with water.

In the above embodiment, the image projection module 150 is disposed outside the second lens 114*b*, as shown in FIG. 1D and FIG. 1E, however, the present disclosure is not limited thereto. In other embodiments, the image projection module 150 may be disposed inside the second lens 114*b*. When the image projection module 150 is disposed inside the second lens 114*b*, the first connection element 151*a* and the second connection element 151*b* may have different designs according to the local structure of the frame 112 on the inside of the second lens 114*b*. Specifically, when the image projection module 150 is disposed inside the second lens 114*b*, an external light ray first passes through the second lens 114*b* from the second opening 112*b*, then pass through the optical element 154 and finally reach the user's eye 159, such that the user can see the real object and the image 160 outside the second lens 114*b* through a light path passing the optical element 154 and the second lens 114*b*.

In summary, when the head-mounted device 100 in the embodiment of the present disclosure is applied to a diver mask, it can provide real-time environmental information to help users make quick and accurate decisions in complex and dangerous environments, which improves safety for the users during diving activities. In addition, when the head-mounted device 100 in the embodiment of the present disclosure is applied to a diver mask, it can further provide real-time image analysis to allow the users to know the types of underwater creatures which are seen by the users during diving, thereby further enrich the diving experience. In addition, the head-mounted device 100 in the embodiment of the present disclosure can be applied to a fire mask and a military gas mask. The real-time environmental information which are provided by the head-mounted device 100 can help users make quick and accurate decisions in fire scenes or battlefields, which improves safety for the users during firefighting operations or military operations.

Although the present disclosure has been disclosed in the foregoing preferred embodiments, they are not intended to limit the present disclosure. Therefore, the scope of protection of the present disclosure shall be subject to the appended patent application scope.

What is claimed is:

1. A head-mounted device, comprising:
   a goggle having a frame and a lens, wherein the frame defines an opening, and the lens is mounted on the opening; and
   an image projection module, comprising:
   a housing fixed on the goggles and defining a channel, a first channel opening and a second channel opening, wherein the channel is between the first channel opening and the second channel opening, and the first channel opening is adjacent to the opening;
   an optical element located on the channel and having a first optical surface and a second optical surface;
   a projector fixed on the housing and configured to project an image light beam toward the optical element, such that the image light beam passes through the first optical surface and the second optical surface sequentially; and
   a reflective element disposed in the housing and configured to receive the image light beam passing through the first optical surface and the second optical surface and reflect the received image light beam to generate a reflected light beam directed to the second optical surface, wherein the optical element is configured to refract the reflected light beam toward the lens to generate a refracted light beam, such that the refracted light beam leaves the channel from the first channel opening and passes through the lens for forming an image, wherein:

the housing has a top wall, a bottom wall, a first side wall and a second side wall, and the top wall, the bottom wall, the first side wall and the second side wall are connected to each other to define the channel, the first channel opening and the second channel, the projector is fixed on the top wall, the reflective element is disposed on the bottom wall, and the channel is located between the projector and the reflective element.

2. The head-mounted device of claim 1, wherein:

the housing further has a first extension wall connected between the bottom wall, the first side wall and the second side wall, and the first extension wall, the bottom wall, the first side wall and the second side wall define a first containing space, and the reflective element is located in the first containing space.

3. The head-mounted device of claim 2, wherein the optical element is a flat-plate beam splitter and has at least one side fixed on the first extension wall.

4. The head-mounted device of claim 3, wherein:

an angle is formed between the first optical surface and the second channel opening, and the angle is within a range between 10 degrees and 85 degrees.

5. The head-mounted device of claim 4, wherein the reflective element has a reflective curved surface configured to receive the image light beam passing through the first optical surface and the second optical surface and reflect the received image light beam to generate the reflected light beam directed to the second optical surface.

6. The head-mounted device of claim 2, wherein:

the housing further has a second extension wall connected between the top wall, the first side wall and the second side wall, the second extension wall, the top wall, the first side wall and the second side wall define a second containing space, and at least one portion of the projector is located in the second containing space, and the second channel opening is defined between the first extension wall and the second extension wall.

7. The head-mounted device of claim 1, wherein:

the image projection module further includes at least one connection element disposed on at least one of the top wall, the bottom wall, the first side wall and the second side wall and configured to connect the frame to fix the housing on the goggles.

8. The head-mounted device of claim 1, further comprising:

a processor electrically connected to the projector and configured to generate information, wherein the projector generates the image light beam according to the information, such that the information is shown in the image.

9. The head-mounted device of claim 8, further comprising:

a sensor electrically connected to the processor and configured to sense physical quantity of an external environment and transmit the physical quantity to the processor, wherein the processor is further configured to generate the information according to the physical quantity.

10. The head-mounted device of claim 8, further comprising:

a camera module electrically connected to the processor and configured to capture an image and transmit the image to the processor, wherein the processor is further configured to generate the information according to the image.

11. The head-mounted device of claim 8, further comprising:

a communication module electrically connected to the processor and configured to receive a wireless signal, convert the wireless signal to an electronic signal and transmit the electronic signal to the processor, wherein the processor is further configured to generate the information according to the electronic signal.

12. An image projection module mounted on a head-mounted device, the head-mounted device having goggles, and the image projection module comprising:

a housing having a top wall, a bottom wall, a first side wall and a second side wall, and the top wall, the bottom wall, the first side wall and the second side wall are connected to each other to define a channel, a first channel opening and a second channel opening, wherein the channel is between the first channel opening and the second channel opening, and the first channel opening is adjacent to the opening;

at least one connection element disposed on at least one of the top wall, the bottom wall, the first side wall and the second side wall, and configured to connect a frame of the goggles to fix the housing on the goggles;

an optical element located on the channel and having a first optical surface and a second optical surface;

a projector fixed on the housing and configured to project an image light beam toward the optical element, such that the image light beam passes through the first optical surface and the second optical surface sequentially; and a reflective element disposed in the housing and configured to receive the image light beam passing through the first optical surface and the second optical surface and reflect the received image light beam to generate a reflected light beam directed to the second optical surface, wherein the optical element is configured to refract the reflected light beam toward the lens to generate a refracted light beam, such that the refracted light beam leaves the channel from the first channel opening and passes through the lens for forming an image, wherein:

the projector is fixed on the top wall, the reflective element is disposed on the bottom wall, and the channel is located between the projector and the reflective element.

13. The image projection module of claim 12, wherein:

the housing further has a first extension wall and a second extension wall, the first extension wall is connected between the bottom wall, the first side wall and the second side wall, the second extension wall is connected between the top wall, the first side wall and the second side wall, the second passage opening is defined between the first extension wall and the second extension wall, the first extension wall, the bottom wall, the first side wall and the second side wall define a first containing space, and the reflective element is located in the first containing space, the second extension wall, the top wall, the first side wall and the second side wall define a second containing space, and at least one part of the projector is located in the second containing space, the optical element is a flat-plate beam splitter and has at least one side fixed on the first extension wall, and an angle is formed between the first optical surface and the second channel opening, and the angle is between 10 degrees and 85 degrees.

14. The image projection module of claim 13, wherein the reflective element has a reflective curved surface configured to receive the image light beam passing through the first optical surface and the second optical surface and reflect the received image light beam to generate the reflected light beam directed to the second optical surface.

15. The image projection module of claim 12, further comprising:

a processor electrically connected to the projector and configured to generate information, wherein the projector generates the image light beam according to the information, such that the information is shown in the image.

16. The image projection module of claim 15, further comprising:

a sensor electrically connected to the processor and configured to sense physical quantity of an external environment and transmit the physical quantity to the processor, wherein the processor is further configured to generate the information according to the physical quantity.

17. The image projection module of claim 15, further comprising:

a camera module electrically connected to the processor and configured to capture an image and transmit the image to the processor, wherein the processor is further configured to generate the information according to the image.

18. The image projection module of claim 15, further comprising:

a communication module electrically connected to the processor and configured to receive a wireless signal, convert the wireless signal to an electronic signal and transmit the electronic signal to the processor, wherein the processor is further configured to generate the information according to the electronic signal.

* * * * *